2,864,842
PREPARATION OF ORGANOMETALLIC COMPOUNDS

Henry A. Walter, Longmeadow, Mass., assignor to Monsanto Chemical Company, St. Louis, Mo., a corporation of Delaware No Drawing. Application June 15, 1956
Serial No. 591,538

10 Claims. (Cl. 260—429.3)

This invention relates to organometallic compounds and to a method for preparing them. More particularly the invention relates to a method for preparing organometallic compounds and especially metal alkyl compounds.

It is an object of this invention to provide a novel process for the manufacture of organometallic compounds that is versatile and can be employed to manufacture a wide variety of organometallic compounds.

Another object is to provide a novel process for the preparation of metal alkyls.

Others objects and advantages of this invention will become apparent from the following detailed description thereof.

In accordance with the present invention there is provided a novel and highly versatile process for the preparation of organometallic compounds. This method comprises reacting a metal hydride with a diazohydrocarbon under anhydrous conditions in an organic medium in the absence of oxygen. The process may be illustrated by the following reaction.

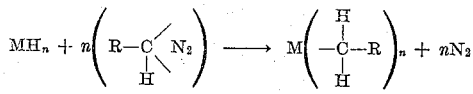

wherein $MH_n$ represents a metal hydride,

is the diazo hydrocarbon and $n$ is an integer.

The following examples are set forth to illustrate more clearly the principle and practice of this invention to those skilled in the art. All parts are by weight.

Example I

Dissolve 100 parts of lithium aluminum hydride in about 10,000 parts of anhydrous diethyl ether. To this should be made slowly with constant agitation while taining about 590 parts of diazoethane. The addition should be made slowly with constant agitation while maintaining the reaction medium at about room temperature, i. e., 20–30° C. A rapid slightly exothermic reaction takes place immediately on the addition of the diazoethane with the evolution of nitrogen. Maintain a blanket of oxygen-free nitrogen over the reaction mixture throughout the duration of the reaction. The completion of the reaction is indicated by the disappearance of the yellow color of diazoethane and the cessation of nitrogen evolution. The product is a diethyl ether solution of lithium aluminum tetraethane. Treatment of the product with carbon dioxide yields diethyl ketone and propionic acid which confirms the presence of lithium aluminum tetraethane.

Lithium aluminum tetraethane is highly inflammable in contact with oxygen. It can be recovered from the diethyl ether solution in which it is prepared by distillation provided oxygen is carefully excluded from the distillation system. It is preferable to let the lithium aluminum tetraethane remain in solution for further uses, e. g., as a polymerization catalyst.

Several metal alkyls are prepared by the general procedure set forth in Example I. In each example set forth below, the metal hydride is slurried in diethyl ether and a dilute solution of a diazoalkane in diethyl ether is added thereto slowly with stirring and at the temperatures specified and under a nitrogen blanket. In each of the examples, 1 molar proportion of the metal hydride is employed and the quantity of diazoalkane added is sufficient to react with each hydrogen of the metal hydride.

Examples II–VIII

| Example | Metal hydride | Diazoalkane | Temperature, °C. | Product |
|---|---|---|---|---|
| II | LiH | Diazobutane | 20 | Butyl lithium. |
| III | AlH₃ | Diazoethane | 20 | Triethyl aluminum. |
| IV | KBH₄ | Diazopropane | 0 | Potassium boron tetrapropane. |
| V | Al(BH₄)₃ | Diazoethane | −20 | Mixture of aluminum and boron ethanes. |
| VI | TiH₂ | Diazobutane | −40 | Dibutyl titanium. |
| VII | ZrH₂ | Diazopentane | −40 | Dipentyl zirconium. |
| VIII [1] | LiH | 1,4-bis(diazo)-butane. | −40 | 1,4-di-lithium butane. |

[1] In this example, two mols of lithium hydride are used per mol of 1,4-bis(diazo)butane.

The metal hydrides of this invention are simple hydrides containing only one metallic element and hydrogen and complex hydrides in which there may be two or more metallic elements combined with hydrogen. They may be represented by the formula $MH_n$ wherein M is taken from the group consisting of metallic elements and mixtures thereof and $n$ is an integer. Typical examples of the simple metal hydrides are the hydrides of the alkali metals, e. g., lithium, sodium, potassium, rubidium and cesium, the hydrides of alkaline earth metals, e. g., beryllium, magnesium, calcium, barium and strontium, and the hydrides of aluminum, zirconium, titanium, and boron. Typical examples of the complex hydrides are lithium aluminum hydride, sodium borohydride, lithium borohydride, and aluminum borohydride. The metal hydrides may be prepared by any of the various known methods.

The diazohydrocarbons of this invention may be represented by the formula

wherein R is a hydrocarbon of the aliphatic, cycloaliphatic or aromatic series. The exact nature of the linkage between the two nitrogen atoms and the carbon atom is not completely settled, some authorities preferring to write the formula as

and others as

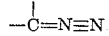

In any event the diazo compounds may be prepared by reacting an N-nitroso-N hydrocarbon urea with aqueous alkali at approximately 0° C. in the presence of a solvent for the diazo compound which solvent is not miscible with the aqueous alkali. Other known methods of preparing these diazo compounds may be used. Typical examples of the useful diazo compounds are diazomethane, diazoethane, diazopropane, diazobutane, diazopentane, diazoisopentane, diazocyclohexyl methane, diazophenyl methane, diazophenyl ethane, diazotolyl methane, etc. It is also within the scope of this invention to employ bis(diazo) hydrocarbons which may react with two metal hydride molecules to provide a di(metal) hydrocarbon as shown in Example VIII.

The amount of diazohydrocarbon used may vary from 1 mol per mol of metal hydride to as many mols as there are hydrogen atoms in the hydride. If the molar ratio of diazohydrocarbon to metal hydride is less than the number of hydrogen atom a metal hydride hydrocarbon is formed such, for instance, as lithium aluminum hydride triethyl. If an excess of diazo compound is used, by-products are formed which interfere with the usefulness of the organometallic compounds.

The reaction of this invention is carried out in rigorously anhydrous organic media and in the total absence of oxygen at temperatures of $-100°$ C. to $50°$ C. The reaction is slightly exothermic and proceeds without the addition of a catalyst. To prevent local overheating it it is advisable to maintain constant agitation throughout the reaction period. Since the diazo hydrocarbons are colored materials and since the reaction involves release of nitrogen gas, the process of the reaction can be followed quite easily and the endpoint determined by disappearance of color and cessation of nitrogen evolution. Among the solvents which may be used are diethyl ether, dioxane, tetrahydrofurane, benzene, kerosene, etc. Mixtures of these solvents may be used. Enough solvent should be used to provide a dilute solution of the reactants and reaction product.

The above descriptions and examples are set forth by way of illustration only. Many other variations and modifications of this invention will be apparent to those skilled in the art and can be made without departing from the spirit and scope of the invention herein described.

What is claimed is:

1. The method of preparing an organometallic compound which comprises dispersing 1 molar equivalent of a metal hydride and up to 1 molar equivalent of a diazohydrocarbon in an anhydrous inert organic liquid at a temperature of $-100°$ C. to $50°$ C. and in the total absence of oxygen.

2. The method of claim 1 wherein the metal hydride employed is lithium aluminum hydride.

3. The method of claim 1 wherein the metal hydride employed is beryllium hydride.

4. The method of claim 1 wherein the metal hydride employed is lithium hydride.

5. The method of claim 1 wherein the metal hydride employed is sodium hydride.

6. The method of claim 1 wherein the metal hydride employed is aluminum borohydride.

7. The method of claim 1 wherein the diazohydrocarbon is diazoethane.

8. The method of claim 1 wherein the diazohydrocarbon is diazobutane.

9. The method of claim 1 wherein the diazohydrocarbon is 1,4-bis(diazo) butane.

10. The method of claim 1 in which the metal hydride is selected from the group consisting of simple hydrides containing only one metallic element and hydrogen and complex hydrides containing a plurality of metallic elements and hydrogen, said metallic elements being selected from the group consisting of alkali metals, alkaline earth metals, aluminum, zirconium, titanium, boron and mixtures thereof; said diazohydrocarbon being selected from the group consisting of diazoalkanes, diazoarylalkanes, and mixtures thereof; and said anhydrous inert organic liquid being selected from the group consisting of acyclic ethers, cyclic ethers, aromatic hydrocarbons, aliphatic hydrocarbons and mixtures thereof.

No references cited.

UNITED STATES PATENT OFFICE

CERTIFICATE OF CORRECTION

Patent No. 2,864,842                                        December 16, 1958

Henry A. Walter

It is hereby certified that error appears in the printed specification of the above numbered patent requiring correction and that the said Letters Patent should read as corrected below.

Column 1, line 52, Example I, strike out "should be made slowly with constant agitation while" and insert instead -- solution, add an anhydrous diethyl ether solution con- --; column 3, line 7, for "atom" read -- atoms --.

Signed and sealed this 21st day of April 1959.

(SEAL)
Attest:

KARL H. AXLINE                                              ROBERT C. WATSON
Attesting Officer                                           Commissioner of Patents